(12) United States Patent
Howell et al.

(10) Patent No.: US 8,851,389 B2
(45) Date of Patent: Oct. 7, 2014

(54) RFID AEROSPACE INDUSTRY TAG AND METHOD OF USE

(75) Inventors: Brent Jarvis Howell, Libertyville, IL (US); John R. Poplawski, Hawthorn Woods, IL (US); Brad K. Lawrenz, Round Lake Hts, IL (US); Jeffrey H. Brandt, Libertyville, IL (US)

(73) Assignee: William Frick & Company, Libertyville, IL (US)

( * ) Notice: Subject to any disclaimer, the term of this patent is extended or adjusted under 35 U.S.C. 154(b) by 88 days.

(21) Appl. No.: 13/569,304

(22) Filed: Aug. 8, 2012

(65) Prior Publication Data

US 2013/0037616 A1 Feb. 14, 2013

Related U.S. Application Data

(60) Provisional application No. 61/574,616, filed on Aug. 8, 2011.

(51) Int. Cl.
  *G06K 19/06* (2006.01)
  *G06K 19/077* (2006.01)
  *G06K 19/02* (2006.01)

(52) U.S. Cl.
  CPC ............ *G06K 19/0776* (2013.01); *G06K 19/02* (2013.01)
  USPC ......................................... 235/492; 235/487

(58) Field of Classification Search
  USPC .................................................. 235/487, 492
  See application file for complete search history.

(56) References Cited

U.S. PATENT DOCUMENTS

| | | | | |
|---|---|---|---|---|
| 6,486,783 | B1* | 11/2002 | Hausladen et al. | 340/572.8 |
| 6,836,215 | B1* | 12/2004 | Laurash et al. | 340/572.1 |
| 7,071,826 | B2* | 7/2006 | Peterson | 340/572.8 |
| 7,388,504 | B2* | 6/2008 | Mess | 340/572.8 |
| 7,425,898 | B2* | 9/2008 | Ryckman | 340/572.1 |
| 7,843,341 | B2* | 11/2010 | Phaneuf et al. | 340/572.1 |
| 7,969,309 | B2* | 6/2011 | Abe et al. | 340/572.1 |
| 8,109,021 | B2* | 2/2012 | Jain et al. | 40/633 |
| 8,424,115 | B2* | 4/2013 | Greer | 2/170 |
| 8,528,826 | B2* | 9/2013 | Baba et al. | 235/492 |
| 2004/0056769 | A1* | 3/2004 | Peterson | 340/572.8 |
| 2004/0091659 | A1* | 5/2004 | Banks et al. | 428/41.8 |
| 2006/0086808 | A1* | 4/2006 | Appalucci et al. | 235/492 |
| 2007/0126588 | A1* | 6/2007 | Mess | 340/572.8 |
| 2007/0145150 | A1* | 6/2007 | Barczyk et al. | 235/492 |
| 2008/0238083 | A1* | 10/2008 | Warford | 283/81 |
| 2008/0303666 | A1* | 12/2008 | Abe et al. | 340/572.1 |
| 2009/0277061 | A1* | 11/2009 | Jain et al. | 40/633 |
| 2009/0291240 | A1* | 11/2009 | Moosheimer et al. | 428/34.1 |
| 2010/0045437 | A1* | 2/2010 | Hioki et al. | 340/10.1 |
| 2010/0281724 | A1* | 11/2010 | Greer et al. | 40/633 |
| 2011/0315774 | A1* | 12/2011 | Baba et al. | 235/488 |

* cited by examiner

*Primary Examiner* — Paultep Savusdiphol
(74) *Attorney, Agent, or Firm* — Justin Lampel

(57) ABSTRACT

The present invention generally relates to an RFID inventory and expiration date tag for an in-cabin airline metal chemical oxygen generator canister or other in-cabin assets (such as canisters) and a method of using the same. The tag is especially suitable for use in connection with metal oxygen or other gaseous metal canisters used in the aerospace industry. The RFID tag allows for the rapid, efficient, accurate, frequent and easy monitoring of the expiration date of the oxygen generator. The tag has a plurality of stacked layers including layers of polypropylene, polyester, UHF Inlay, fire retardant polypropylene and an acrylic adhesive. The tag extends directly outward from the generator at a tangent to approximately a ninety degree angle with respect to the generator.

17 Claims, 3 Drawing Sheets

RFID AEROSPACE INDUSTRY TAG AND METHOD OF USE

RELATED APPLICATIONS

The present application is based on U.S. provisional application No. 61/574,616 filed on Aug. 8, 2011, the entire contents of which are incorporated by reference. Applicant claims the priority benefit of the '616 application.

BACKGROUND OF THE INVENTION

The present invention generally relates to an RFID inventory and expiration date tag for an in-cabin airline metal chemical oxygen generator canister or other in-cabin assets (such as canisters) and a method of using the same. The tag is especially suitable for use in connection with metal oxygen or other gaseous metal canisters used in the aerospace industry. The RFID tag allows for the rapid, efficient, accurate, frequent and easy monitoring of the expiration date of the oxygen generator. The tag has a plurality of stacked layers including layers of polypropylene, polyester, UHF Inlay, fire retardant polypropylene and an acrylic adhesive. The tag extends directly outward from the generator at a tangent to approximately a ninety degree angle with respect to the generator.

The present device allows inventorying and assessing the expiration dates of all oxygen generators without having to open any of the multiple access panels throughout the cabin to capture this data. Data is collected wirelessly, without requiring a line of sight between an RFID reader and the tag located on the canister. Optimally, the present tag may read at approximately ten feet or more from an RFID reader.

Present methods of inspecting tags require a few hours for multiple inspectors to open all the access panels and to conduct inventory and to examine the expiration dates of all the metal chemical oxygen generator canisters, create a maintenance order for replacements, and to then reseal the access panels. Using this device, the in-cabin inventory process may only take a few minutes as no access panels need be disturbed, unless a replacement oxygen generator is necessary.

The tag has a plurality of stacked layers including layers of polypropylene, polyester, alien squiggle, fire retardant polypropylene and an acrylic adhesive. The layers create a device which is used to replace previous methods of keeping track of these canisters including previous handwritten entries of serial numbers taken when installing replacement metal chemical oxygen generator canisters. As a result, the accuracy of the inventory and expiration date database is greatly increased.

The properly attached adhesive tag extends (substantially outward) from the metal generator therein allowing handheld RFID readers to quickly read the encoded data without electrical interference from the metal generator. More specifically, the tag may stick out anywhere from a tangent to the metal generator to approximately ninety degrees from the generator. Once installed, the device adopts a "flag" orientation which allows for an easy RFID reading.

A chemical oxygen generator is a device releasing oxygen created by a chemical reaction. The oxygen source is usually an inorganic superoxide, chlorate, or perchlorate. A promising group of oxygen sources are ozonides. The generators are usually ignited mechanically, by a firing pin, and the chemical reaction is usually exothermic, making the generator a potential fire hazard. Potassium superoxide was used as an oxygen source on early manned USSR space missions, for fire fighters, and for mine rescue. A typical oxygen generator used in the aerospace industry last approximately twelve years. However, airlines commonly dispose of these generators as early as eighteen months prior to the date of expiration for fear of the generators expiring. Hefty fines from the FAA can be imposed for using generators which are expired. As a result, the present device also helps reduce or eliminate these fines by having accurate information. More specifically, the tag of the present device improves the monitoring and documenting of relevant information related to the expiration and the useful life of the generators.

Keeping accurate records of the life of oxygen canisters is critically important in aviation. The National Transportation Safety Board (NTSB) determined that ValuJet Flight 592, which crashed in May of 1996, was caused by a fire which started as a result of chemical oxygen generators placed in the cargo compartment. The crashed killed all 110 on board.

The NTSB determined that just before takeoff, expired chemical oxygen generators were placed in the cargo compartment in five boxes marked COMAT (Company-owned material) by ValuJet's maintenance contractor in contravention of FAA regulations forbidding the transport of hazardous materials in aircraft cargo holds. Failure to cover the firing pins for the generators with the prescribed plastic caps made an accidental activation much more likely. Rather than covering the firing pins, the contract workers simply duct taped the cords around the cans, or cut them, and used tape to stick the ends down. It is also possible that the cylindrical, tennis ball can-sized generators were loaded onboard in the mistaken belief that they were just canisters, and that they were empty, thus being certified as safe to transport in an aircraft cargo compartment. Contract employees indicated on the cargo manifest that the "canisters" were empty, when in fact they were not.

Chemical oxygen generators, when activated, produce oxygen. As a byproduct of the exothermic chemical reaction, they also produce a great quantity of heat. These two together were sufficient not only to start an accidental fire, but also produce the extra oxygen needed to keep the fire burning, made much worse by the presence of combustible aircraft wheels in the hold. NTSB investigators theorized that when the plane experienced a slight jolt while taxiing on the runway, an oxygen generator unintentionally activated, producing oxygen and heat. Laboratory testing showed that canisters of the same type could heat nearby materials up to 500° F. (260° C.), enough to ignite a smouldering fire. The oxygen from the generators fed the resulting fire in the cargo hold.

With respect to general RFID tag use, over the years, numerous RFID tags have been used to track and monitor different types of items. For example, U.S. Pat. No. 7,680,691 to Kimball et al. discloses an inventory management system that includes an RFID interrogator and corresponding RFID tags that are placed on items to be monitored. The tags can be used to monitor the storage time of food items stored in a refrigerator or pantry, the time in use of replaceable items such as toilet bowl cleaners, or the nature of laundry items being washed. The interrogator can be coupled to a display providing various reports on the status of such items. Also disclosed are devices for dispensing such RFID tags.

Further, U.S. Pat. No. 6,982,640 to Lindsay discloses a method for tracking the freshness or expiration dates of food products put into storage. The food products placed into storage are provided with smart tags, the smart tags containing food product information regarding the freshness or expiration date of the food product. The food products are scanned with a smart tag scanner prior to placing the products into storage, the scanner configured to retrieve the food product information from the smart tags. The user may be alerted if the retrieved information indicates that the food product being placed into storage has expired or is no longer fresh. The food products are placed in storage, and the user may be alerted when any of stored products have expired or are no longer fresh.

U.S. Pat. No. 7,269,476 to Ratnakar discloses a medicine dispensing system that comprises a medicine container with an inbuilt pill dispensing assembly which automatically dispenses a prescribed dose of medicine at prescribed times. It alerts the patient when a dose of medicine has been dispensed. The alert signal is a local audio or visual alarm or a remote reminder by phone, wireless network or internet. A modem and communication ports are provided which enable the said medicine container to communicate with remote parties like health care professionals and medical devices such as glucose meter. This feature allows remote medicine management, disease management and health education. An internal microprocessor and a memory chip control and execute electronic functions of the said medicine container. Sensors are provided to detect whether a dose has been dispensed and whether it is consumed. The said medicine container is able to record, analyze and report patient's compliance with a medicine regimen.

However, these patents fail to disclose an RFID tag for use in connection with oxygen generators or other canisters wherein the RFID tag is extended outward from a metal storage container or canister in a manner wherein the tag is easily scanned. A need, therefore, exists for an improved RFID aerospace industry tag and a method of using the same.

SUMMARY OF THE INVENTION

The present invention generally relates to an RFID inventory and expiration date tag for an in-cabin airline metal chemical oxygen generator canister or other in-cabin assets (such as canisters) and a method of using the same. The tag is especially suitable for use in connection with metal oxygen or other gaseous metal canisters used in the aerospace industry. The RFID tag allows for the rapid, efficient, accurate, frequent and easy monitoring of the expiration date of the oxygen generator. The tag has a plurality of stacked layers including layers of polypropylene, polyester, UHF 2 Inlay, fire retardant polypropylene and an acrylic adhesive. The tag extends directly outward from the generator from a tangent to approximately a ninety degree angle with respect to the generator.

An advantage of the present RFID aerospace industry tag is that the tag is easily transported.

And another advantage of the present RFID aerospace industry tag is that the tag adds minimal additional weight to the aircraft providing a fuel savings from other potential designs.

Still another advantage of the present RFID aerospace industry tag is that the RFID tag may be easily and accurately read without electrical interference from, for example, a metal generator or canister interfering with the RFID circuitry as a result of the RFID circuitry on the tag being extended out and away from the generator or canister.

Another advantage of the RFID tag is that the tag may be read through the access panel to the metal chemical oxygen generator canisters therein reducing the labor cost and time needed to conduct a normal inventory.

Yet another advantage of the present RFID aerospace industry tag is that the tag extends outward from a metal canister in a stiff and straight manner allowing quick readings with a hand held reader at greater distances than other tag placement options.

Yet another advantage of the present RFID aerospace industry tag is that the tag may meet flammability tests in accordance with 14 CFR FAR 25.853(a) Appendix F, Part 1 and may have S.A.E. AS5678 certification.

Still another advantage of the present RFID aerospace industry tag is that the canister used in connection with the present tag may have a greatly extended lifespan as a result of being able to be used closer to the required expiration date than current practices.

Another advantage of the present RFID aerospace industry tag is that the tag is easily read by and RFID scanner at greater distances allowing the capture of data from a greater number of tags in a shorter period of time.

Still another advantage of the present RFID aerospace industry tag is to provide a tag which is durable.

Yet another advantage of the present RFID aerospace industry tag is that the tag helps reduce or eliminate FAA fines often imposed for using expired generators.

And another advantage of the present RFID aerospace industry tag is to provide a multilayered tag which is easy to secure to a canister.

An advantage of the present RFID aerospace industry tag is that the tag may be tuned to perform on a global frequency range, allowing the tag to be read anywhere in the world.

Still another advantage of the present RFID aerospace industry tag is to provide a tag whose data is collected independent of the light conditions be it a low light or zero light settings (in a secured panel).

An advantage of the present tag is that the tag may have a fluorescent marking so as to allow the tag to be seen in low light.

Yet another advantage of the present RFID aerospace industry tag is that the tag is light weight.

An advantage of the present RFID aerospace industry tag is that the tag may be ready quickly allowing for a quick take off of the plane.

And another advantage of the present RFID aerospace industry tag is that the tag may be used to provide improved accurate expiration, transportation and other records with respect to the generators.

Yet another advantage of the present RFID aerospace industry tag is that the tag's extended user memory may be programmed to hold additional information beyond the expiration date and the extended user memory may be programmed with spec 2000 industry standard data.

An advantage of the present RFID aerospace industry tag is that the tag may be more accurate than normal human readings as transpositions and/or interpretation errors are eliminated.

Still another advantage of the present RFID aerospace industry tag is that the tag may allow a user to automate data collection thus provide the ability to forecast and budget the purchase of replacement oxygen generators therein reducing inventory carrying costs.

Yet another advantage of the present RFID aerospace industry tag is that the tag may be used to reduce labor, delays and data entry errors currently common in existing generator expiration data collection process.

For a more complete understanding of the above listed features and advantages of the RFID aerospace industry tag reference should be made to the following detailed description of the preferred embodiments and to the accompanying drawings.

DETAILED DESCRIPTION OF THE PREFERRED EMBODIMENTS

The present invention generally relates to an RFID inventory and expiration date tag for an in-cabin airline metal chemical oxygen generator canister or other in-cabin assets (such as canisters) and a method of using the same. The tag is especially suitable for use in connection with metal oxygen or other gaseous metal canisters used in the aerospace industry. The RFID tag allows for the rapid, efficient, accurate, frequent and easy monitoring of the expiration date of the oxygen generator. The tag has a plurality of stacked layers including layers of polypropylene, polyester, UHF Inlay, fire retardant polypropylene and an acrylic adhesive. The tag extends directly outward from the generator at a tangent to approximately a ninety degree angle with respect to the generator.

Figure 1:
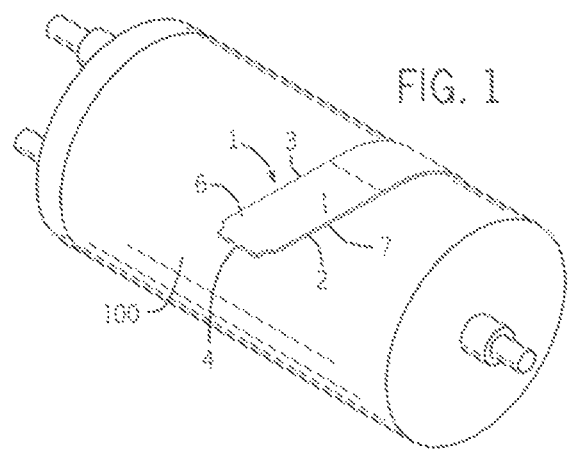
FIG. 1 illustrates a front perspective view of an embodiment of the RFID aerospace industry tag attached to an oxygen generator (or canister).
Figure 2:
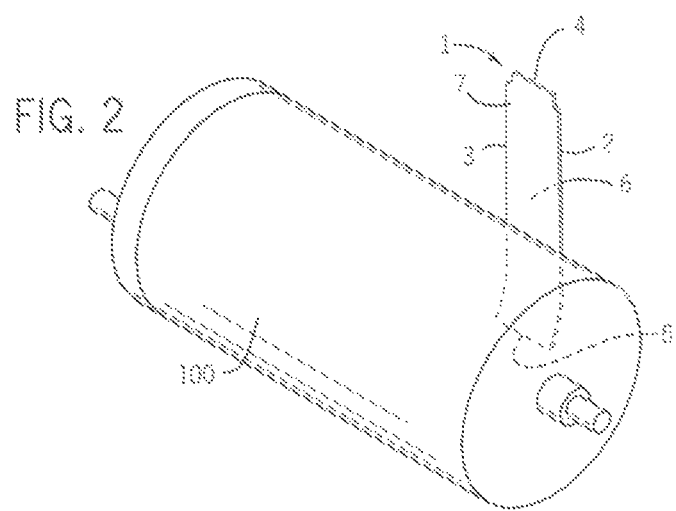
FIG. 2 illustrates a back perspective view of an embodiment of the RFID aerospace industry tag attached to an oxygen generator.
Figure 3:
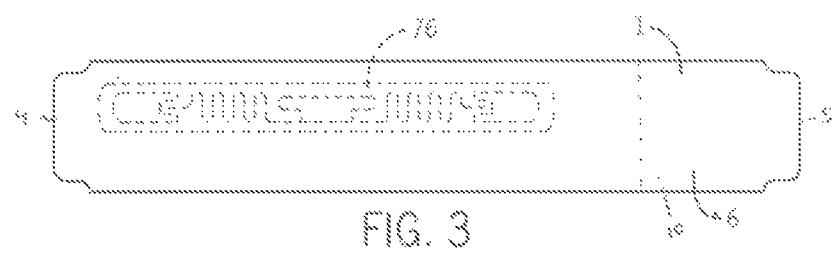
FIG. 3 illustrates a top view of the RFID aerospace industry tag.
Figure 4:
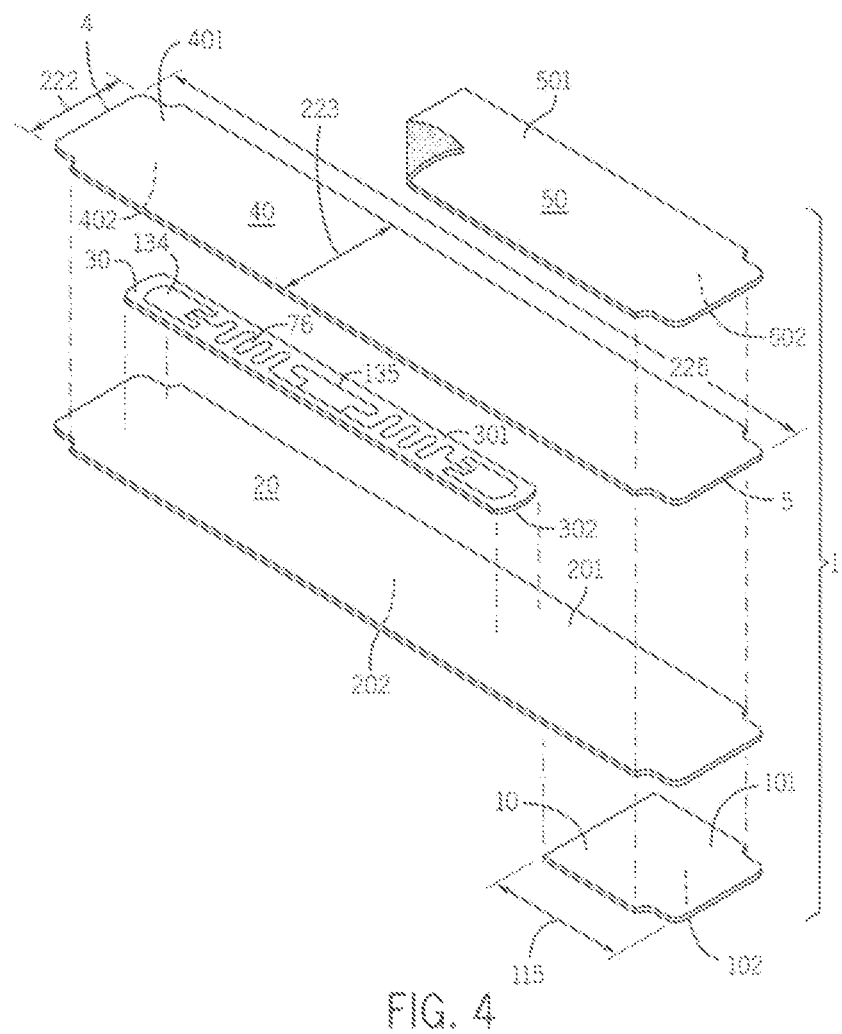
FIG. 4 illustrates an exploded side view of the layers of the RFID aerospace industry tag.

Referring now to the figures wherein like numbers refer to like parts, an RFID aerospace industry tag 1 is provided. The RFID aerospace industry tag 1 may have a front 2, a back 3, a first side 4, a second side 5, a top 6 and a bottom 7 (FIG. 2). Further, the RFID aerospace industry tag 1 may have a plurality of layers wherein the plurality of layers are secured together as a single unit. More specifically, the RFID aerospace industry tag 1 may have a first layer 10 (the adhesive layer), a second layer 20, an electronic third layer 30, a fourth layer 40 and an optional fifth layer 50 (FIG. 4). All five layers may be made from a generally durable, flexible material. In an embodiment, the device 1 may be fire-resistant. Further, in an embodiment, at least the first layer 10, second layer 20, electronic third layer 30 and fourth layer 40 are secured together as a single unit which cannot be separated.

In an embodiment, the bottom 7 of the device 1 may have the first layer 10 whereas the top 6 of the device 1 may have the optional fifth layer 50 and wherein the second layer 20, electronic third layer 30 and fourth layer 40 are located between the bottom 7 and the top 6 and wherein the entire device 1 is compressed into a single, thin tag which is capable of going through a printer. More specifically, in an embodiment, the first layer 10, second layer 20, electronic third layer 30 and fourth layer 40 may not be separated from each other. In the embodiment with the optional fifth layer 50, the optional fifth layer 50 may be removed from the fourth layer 40.

The first layer 10 may, for example, be constructed from a permanent acrylic adhesive. The first layer 10 may be the only layer which physically attaches or touches the oxygen generator (or canister) 100. Referring now to FIG. 4, the first layer 10 may have a top side 101 and a bottom side 102 wherein the first layer 10 is a strong acrylic adhesive. The first layer 10 may permanently secure the RFID tag 1 (as defined below) to the generator 100. The RFID tag 1 may not be removed or replaced from the generator 100 without causing damage to the RFID tag 1. As a result, any damage to the RFID tag 1 requires an inspector to inspect the generator 100 for safety.

The second layer 20 may, for example, be constructed from a black fire retardant polypropylene. In an embodiment, the second layer 20 may have a height of approximately 0.010". The second layer 20 may have a top side 201 and a bottom side 202. The bottom side 202 of the second layer 20 may be in contact with the top side 101 of the first layer 10. The second layer 20 may be fairly stiff so as to provide support to the entire RFID aerospace industry tag 1 and therein allow the tag 1 to extend outward from the generator 100 in a non-flush manner with respect to the exterior surface of the generator 100.

The electronic third layer 30 may, for example, be a UHF RFID inlay such as, for example, Alien Squiggle ALN-9640-FWRW or a future RFID inlay. The electronic third layer 30 may have a top side 301 and a bottom side 302. The bottom side 302 of the electronic third layer 30 may be in contact with the top side 201 of the second layer 20. The electronic third layer 30 may be made from, or may include, the radio frequency identification (RFID) component 76. The RFID component 76 of the present device is preferably a passive RFID component 76; however, in some embodiments, the RFID component 76 may be an active component requiring an independent power source.

The RFID component 76 of the electronic third layer 30 may have a microchip 134 attached to an antenna 135. The RFID component 76 of the electronic third layer 30 is located closer to the first side 4 of the tag 1 than to the second side 5 of the tag 1. As a result, the electrical circuitry of the RFID component 76 is ultimately located as far away from the metal of the generator 100 as possible; therein reducing electrical interference between the RFID component 76 and the metal housing of the generator 100.

In an embodiment, the electronic third layer 30 is located completely within a perimeter of the second layer 20 and a perimeter of the fourth layer 40 such that the electronic third layer 30 is not visible when the tag 1 is completely secured into a single unit. When the multiple layers are completely sealed as a single inseparable unit, the electronic third layer 30 is protected by at least the second layer 20 and the fourth layer 40. In an embodiment, the electronic third layer 30 does not vertically overlap with the first layer 10. As a result of the tag 1 only being secured to and in direct contact with the generator 100 at the first layer 10, the electrical circuitry of the RFID component 76 of the electronic third layer 30 does not rest over or come in close proximity to the metal generator 100 and electrical interference is therefore reduced or eliminated.

Figure 6:
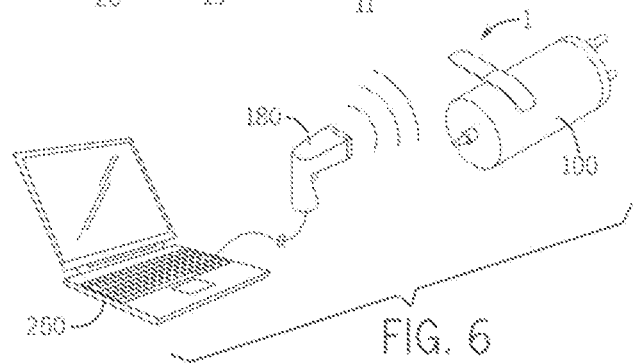
FIG. 6 illustrates the RFID reader being used to read the device which is inserted on a generator.

The antenna 135 may be readable by an RFID scanner (or reader) 180 (FIG. 6) when the scanner 180 is brought within the read range of the RFID aerospace industry tag 1 or multiple tags 1. More specifically, the RFID scanner 180 detects compatible RFID aerospace industry tags 1 of generators 100 within its range. The RFID scanner 180 detects the serial number, or other information which identifies a specific RFID aerospace industry tag 1 and accompanying generator 100. The antenna 135 allows the microchip 134 to transmit the identification information to the RFID scanner 180. The RFID scanner 180 transmits the electromagnetic radio wave signal at a set frequency, which activates RFID aerospace industry tag 1 designated to receive this frequency. In an embodiment, the RFID scanner 180 sends the information to a computer 250. In an embodiment, the RFID scanner 180 records and stores the information contained on the microchip 134 without sending the information to a computer 250.

In an embodiment, the tag 1 may be produced and then encoded with information only after the consumer (airlines) purchases the tag 1. More specifically, the information contained on the RFID tag 1 may be encoded by the manufacturer or may be encoded by the consumer (airlines). Further, the RFID tag 1 may be locked by the manufacturer or the consumer so as to reduce or eliminate fraud or reduce unauthorized people from obtaining access to the information contained on the RFID tag 1.

When the RFID aerospace industry tag 1 passes through the electromagnetic radio wave signal, it detects the RFID scanner's 180 signal. The RFID scanner 180 converts the electromagnetic radio wave signal reflected back from the RFID aerospace industry tag 1 into digital information that can be then passed on to computers 250 that make use of it. The RFID scanner 180 decodes the serial number and other information encoded in the RFID aerospace industry tag's 1 integrated circuit (silicon microchip) 134 and the information may be passed to the host computer 250. Application software on the host computer 250 processes the information, and may perform various filtering operations to reduce the numerous often redundant reads of the same RFID aerospace industry tag 1 to a smaller and more useful information set.

The fourth layer 40 may, for example, be constructed from a white polyester. The fourth layer 40 may have a top side 401 and a bottom side 402. In an embodiment, the fourth layer 40 may have a height of approximately 0.002". The bottom side 402 of the fourth layer 40 may be in contact with the top side 301 of the third layer 30. The fourth layer 40 may have a length 225 which is substantially greater than a length 115 of the first layer 10. The fourth layer 40 may provide protection to the top side 301 of the third layer 30.

The optional fifth layer 50 may, for example, be constructed from a white removable polypropylene. In an embodiment, the device 1 may only have the remaining four layers. In an embodiment, the optional fifth layer 50 may have a height of approximately 0.0035". The optional fifth layer 50 may have a top side 501 and a bottom side 502. The bottom side 502 of the optional fifth layer 50 may be in contact with the top side 401 of the fourth layer 40.

The optional fifth layer 50 may be the most distal layer from the oxygen generator 100. In an embodiment, the optional fifth layer 50 may have florescent or glow in the dark markings allowing a user to easily spot and read data and other information located on the fifth layer 50 even in reduced lighting.

The adhesive first layer 10 may secure only a small portion of the entire length 225 of the RFID aerospace industry tag 1 to the generator 100 while the remaining portion (i.e. the portion from an end of the first layer 10 through to the first side 4 of the tag 1) of the RFID aerospace industry tag 1 extends outward at a tangent to approximately ninety degrees with respect to the generator 100.

In an embodiment, the second layer 20 and fourth layer 40 may be of substantially the same size and shape. The first layer 10 may be the smallest layer and may have a removable backing 11 (FIG. 5) wherein the removable backing 11 prevents the adhesive first layer 10 from coming into contact with an object prior to use on the generator 100. In use, the backing 11 is removed just prior to insertion of the device 1 onto the generator 100. The electronic third layer 30 may be smaller than the second layer 20 and fourth layer 40, but may be larger than the first layer 10.

Figure 5:
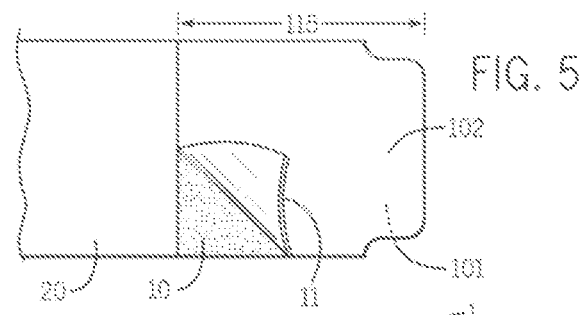
FIG. 5 illustrates the removable backing of the first layer being removed.
Figure 7:
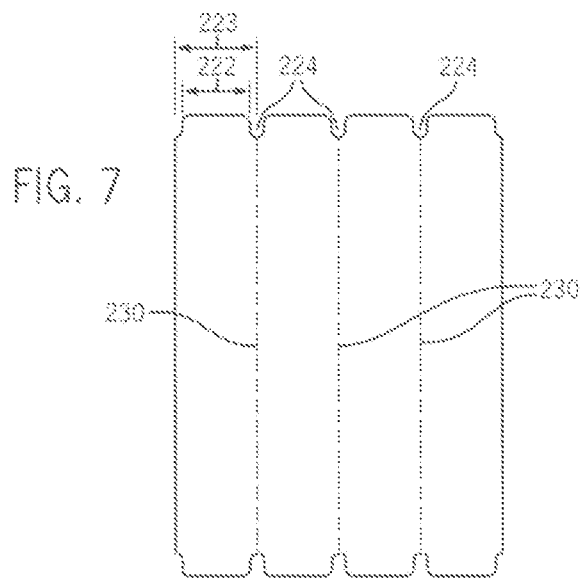
FIG. 7 illustrates multiple RFID aerospace industry tags secured together during printing.

Referring now to FIGS. 4 and 5, the first side 4 of the RFID tag 1 and the second side 5 of the RFID tag 1 may each have a width 222 which is slightly less than the width 223 along the middle section of the device 1. More specifically, the first side 4 and the second side 5 of the device 1 may slightly curve inward so as to provide a small opening 224 (FIG. 7) between the ends of multiple FRID tags 1 which are attached along a perforation line 230. The small opening 224 and the perforation line 230 allows a single RFID tag 1 to be removed from other tags which are produced in the same manufacturing run. As a result, a user may quickly tear off a single RFID tag 1 to insert the same on a generator 100. Further, the small openings 224 may trigger a printer to change or otherwise print different information on a tag 1 then the information printed on the previous tag 1 by the printer.

As stated above, the tag 1 extends outward from the generator 100 at a tangent to approximately ninety degrees with respect to the generator 100. More specifically, because generators are typically round, the straight and stiff tag 1 extends outward from the generator 100 wherein only the first layer 10 (the adhesive layer) is generally in direct contact with the generator 100. As a result, the electrical circuitry of the RFID component 76 (the electronic third layer) of the tag 1 is located away from the metal casing of the generator 100 and electrical interference between the metal generator 100 and the RFID electrical component 76 is greatly reduced over current RFID tags which may be secured flush to a metal housing. Therefore, the RFID tag 1 of the present device may be read at a much greater distance (and in a "cone-shaped" reading manner) over the prior systems. Further, because of the reduced electrical interference obtained in having the RFID electrical component 76 located away from the metal housing of the generator 100, the tag 1 may be read by the RFID reader 180 when the tag 1 and generator 100 are secured in an unopened panel (not shown).

The present RFID aerospace industry tag 1 may be used to document and acquire improved expiration date information, transportation information and other data with respect to the generators. Currently, a worker must open a panel on a generator, visually read the serial number and expiration data on that panel, write down the same and replace any generators that are close to expiring. Errors are not uncommon. This pre-flight process is repeated daily even taking up many hours per flight depending on the number of generators on board the aircraft. The present RFID aerospace industry tag 1 drastically reduces this previous time so that the information may be captured, recorded and transported much more accurately and in as little as a few minutes per plane. The RFID aerospace industry tag 1 and method of the present application also may allow a user to forecast and purchase replacement oxygen generators 100 by therein reducing inventory.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the present application.

We claim:

1. A multilayer RFID tag for securing to a metallic object comprising:
   an adhesive first layer;
   a second layer having a first side, a second side, a top surface and a bottom surface wherein the second layer is rigid so as to provide support for the tag and wherein the rigid second layer allows the tag to extend tangentially outward from the object in a non-flush manner with respect to the object wherein the adhesive first layer is only located at the first side of the bottom surface of the second layer and wherein the second side of the bottom surface of the second layer does not have an adhesive and does not come into contact with the object;

wherein the second layer has a greater surface area than the first layer and wherein the second layer is rigid and does not fold, but adopts an identical curvature as any curvature of the object the RFID tag is secured to;

an electronic third layer wherein the electronic third layer has RFID circuitry having an RFID element and an antenna element and wherein the electronic third layer is located closer to the second side of the second layer than to the first side of the second layer to reduce electrical interference;

a fourth layer having a top surface and a bottom surface and wherein the second layer is located between the first layer and the electronic third layer and wherein the electronic third layer is located between the second layer and the fourth layer and wherein the electronic third layer is completely surrounded by the second layer and fourth layer and wherein all the layers are secured together to form a single inseparable unit having a first end and a second end; and wherein the rigid second layer allows the RFID circuitry of the third layer to be located away from and not in direct contact with the metallic object therein reducing electrical interference between the RFID circuitry of the third layer and the metallic object.

2. The multilayer RFID tag of claim 1 further comprising: a fifth layer secured to the top surface of the fourth layer wherein the fifth layer is made from a white removable polypropylene material and wherein the fifth layer is smaller than the fourth layer.

3. The multilayer RFID tag of claim 2 wherein the fifth layer has florescent or glow in the dark markings to increase visibility in diminished light.

4. The multilayer RFID tag of claim 1 wherein the adhesive first layer is smaller than the second layer and smaller than the fourth layer and wherein the adhesive first layer has a length which is less than a length of the second layer and less than a length of the electronic third layer and less than a length of the fourth layer and wherein the adhesive first layer and only the adhesive first layer is secured directly to the metallic object.

5. The multilayer RFID tag of claim 1 further comprising: a removable backing layer temporarily secured to the adhesive first layer wherein the removable backing layer has a shape substantially identical to the shape of the adhesive first layer and wherein the removal of the removable backing layer exposes the adhesive first layer and allows the RFID tag to be secured to the metallic object.

6. The multilayer RFID tag of claim 1 wherein the size and shape of the second layer is identical to the size and shape of the fourth layer.

7. The multilayer RFID tag of claim 1 further comprising: electronic data stored on the electronic third layer wherein the electronic data stored on the electronic third layer is capable of being read by an RFID reader and wherein the electronic data stored on the electronic third layer relates to the metallic object for which the RFID tag is secured to.

8. The multilayer RFID tag of claim 1 wherein the electronic third layer is located closer to first end of the single inseparable unit than to the second end of the single inseparable unit and wherein the adhesive first layer is located at the second end of the single inseparable unit and wherein the electronic third layer is located distal from the metallic object for which the RFID tag is secured to and wherein only the second end of the single inseparable unit is secured directly to the metallic object.

9. The multilayer RFID tag of claim 1 wherein the adhesive first layer does not vertically overlap with the electronic third layer.

10. The multilayer RFID tag of claim 1 further comprising: a first side of the tag and a second side of the tag wherein second side of the tag is connected to the metallic object and wherein the first side of the tag is not connected to the metallic object and wherein the electronic third layer is located closer to the first side of the tag than to the second side of the tag.

11. The multilayer RFID tag of claim 1 wherein the fourth layer is constructed of a white polyester.

12. The multilayer RFID tag of claim 1 wherein the fourth layer has a length which is greater than a length of the first layer.

13. The multilayer RFID tag of claim 1 wherein the RFID tag is fire resistant.

14. The multilayer RFID tag of claim 1 wherein the first layer is a permanent acrylic adhesive.

15. The multilayer RFID tag of claim 1 wherein the third layer is a passive RFID inlay.

16. The multilayer RFID tag of claim 1 wherein the tag may not be removed from the metallic object without destroying the RFID tag.

17. A multilayer RFID tag sheet comprising:
a first and a second multilayer RFID tag for securing to a metallic object wherein both the first and second multilayer RFID tag each has:
an adhesive first layer;
a second layer having a first side, a second side, a top surface and a bottom surface wherein the second layer is rigid so as to provide support for the tag and wherein the rigid second layer allows the tag to extend tangentially outward from the metallic object in a non-flush manner with the metallic object wherein the adhesive first layer is only located at the first side of the bottom surface of the second layer and wherein the second side of the bottom surface of the second layer does not have an adhesive and does not come into contact with the object;
wherein the second layer has a greater surface area than the first layer and wherein the second layer is rigid and does not fold, but adopts an identical curvature as any curvature of the object the RFID tag is secured to;
an electronic third layer wherein the electronic third layer has RFID circuitry having an RFID element and an antenna element and wherein the electronic third layer is located closer to the second side of the second layer than to the first side of the second layer to reduce electrical interference;
a fourth layer having a top surface and a bottom surface and wherein the second layer is located between the first layer and the electronic third layer and wherein the electronic third layer is located between the second layer and the fourth layer and wherein the electronic third layer is completely surrounded by the second layer and fourth layer and wherein all the layers are secured together to form a single inseparable unit having a first end and a second end;
wherein the rigid second layer allows the RFID circuitry of the third layer to be located away from and not adjacent to the metallic object therein reducing electrical interference between the RFID circuitry of the third layer and the metallic object; and a perforation line between the first and second multilayer RFID tag such that the first and second multilayer RFID tags may be easily separated from each other by pulling on one of the multilayer RFID tags and wherein each of the multilayer RFID tags has a slight curve inward at an end which allows a user to more easily separate the first multilayer RFID tag from the second multilayer RFID tag.

\* \* \* \* \*